United States Patent [19] [11] Patent Number: 4,770,837
Lu et al. [45] Date of Patent: Sep. 13, 1988

[54] METHOD FOR MAKING ARTICLES FROM POLYMER BLENDS

[75] Inventors: Pang-Chia Lu, Pittsford; Gordon V. Sharps, Fairport; Tien-Kuei Su, Pittsford, all of N.Y.

[73] Assignee: Mobil Oil Corporation, New York, N.Y.

[21] Appl. No.: 926,835

[22] Filed: Nov. 3, 1986

Related U.S. Application Data

[63] Continuation of Ser. No. 694,727, Jan. 24, 1985, abandoned.

[51] Int. Cl.$^4$ ................. B29C 47/06; B29C 47/24
[52] U.S. Cl. ........................... 264/503; 264/514; 264/173; 264/209.2; 264/312; 425/133.1; 425/326.1; 425/462
[58] Field of Search ............... 264/173, 209.1, 209.2, 264/209.8, 312, 514, 515, 503; 425/131.1, 133.1, 462, 467, 326.1

[56] References Cited

U.S. PATENT DOCUMENTS

| 2,973,783 | 3/1961 | Boe | 264/209.2 |
| 3,093,255 | 6/1963 | Mesbrobian et al. | 215/1 |
| 3,632,711 | 1/1972 | Rasmussen | 264/173 |
| 3,716,612 | 2/1973 | Schrenk et al. | 264/312 |
| 3,759,647 | 9/1973 | Schrenk et al. | 425/462 |
| 3,857,754 | 12/1974 | Hirata et al. | |
| 3,933,960 | 1/1976 | Cameron et al. | 264/173 |
| 3,962,396 | 6/1976 | Ono et al. | 264/173 |
| 3,966,861 | 6/1976 | Papesh et al. | 264/209.2 |
| 4,109,037 | 8/1978 | Nohara | 264/209.1 |
| 4,217,161 | 8/1980 | Yamada et al. | 264/511 |
| 4,233,367 | 11/1980 | Ticknor et al. | 264/514 |
| 4,247,584 | 1/1981 | Widiger et al. | 264/514 |
| 4,410,482 | 10/1983 | Subramanian | 264/515 |
| 4,420,451 | 12/1983 | Rasmussen | 264/209.2 |
| 4,532,100 | 7/1985 | Lancaster et al. | 425/326.1 |

FOREIGN PATENT DOCUMENTS

| 47-26664 | 7/1972 | Japan | 425/133.1 |
| 53-88060 | 8/1978 | Japan | 264/173 |
| 53-108162 | 9/1978 | Japan | 264/514 |

Primary Examiner—Jeffery Thurlow
Attorney, Agent, or Firm—Alexander J. McKillop; Michael G. Gilman; James P. O'Sullivan, Sr.

[57] ABSTRACT

Polymer blends comprising a continuous matrix phase of thermoplastic polymer with a discontinuous phase of thermoplastic polymer distributed through it are produced by extruding a blend of immiscible thermoplastic polymers through an annular extrusion die which subjects the polymer blend to transverse shear forces prior to passing through the die lips. The application of the shear forces to the polymer blends produces improved uniformity of distribution of the continuous phase within the matrix, producing better properties in the finished article which may be a blown film or a blow molded product. The continuous matrix phase is suitably a polyolefin such as polyethylene and the discontinuous phase may be selected to provide the desired properties in the extruded article, for example, vapor barrier properties, strength, stiffness, and tear resistance. Typical polymers for the discontinuous phase are polyamides, EVA copolymers, polyacrylonitrile, polystyrene and various copolymers. The annular extrusion die which is used has an annular flow passage between two relatively moving walls in which the resin blend is subjected to the shear forces which promote the distribution of the continuous phase in the matrix.

23 Claims, 1 Drawing Sheet

METHOD FOR MAKING ARTICLES FROM POLYMER BLENDS

This is a continuation of copending application Ser. No. 694,727, filed on Jan. 24, 1985, now abandoned.

FIELD OF THE INVENTION

This invention relates to a method for making articles, especially films, from blends of thermoplastic polymers and, more particularly, to a method for making articles of a heterogeneous blend of thermoplastic polymers.

BACKGROUND OF THE INVENTION

Many different kinds of shaped articles such as films, filaments, sheets, containers and tubing may be made from various polymers and polymeric compositions. In many cases, the shaped articles are required to have special properties and it has often been necessary to develop special blends of various resins in order to meet particular requirements. For example, it may be desired to make a film which has good strength, tear resistance and toughness while at the same time possessing good vapor barrier properties. If there is no single polymer which will confer this desired combination of properties, it may be necessary to use a blend of polymers or to fabricate a laminar film in which the individual layers of the laminate combine to provide the desired combination of properties. Another approach which has recently received attention is to employ a heterogeneous blend of polymers in which one polymer is dispersed in another polymer in the form of thin, parallel and overlapping layers embedded in the continuous phase. The dispersed polymer may be used to provide vapor barrier properties, as disclosed in U.S. Pat. No. 4,410,482 or other properties, such as strength, stiffness, or tear resistance. Because a dispersed phase which generally will have a different refractive index to the continuous phase is present, the optical properties of the blend will generally be affected although if transparency is to be retained, suitable choice of blend components may minimize the optical losses which occur at the phase boundaries. Generally, the heterogeneous blends will be ternary compositions comprising a base polymer which constitutes the continuous phase, a dispersed polymer and a compatibilizer which is used to balance the phase boundary. Ternary blends of this kind are described, for example, in U.S. Pat. Nos. 3,857,754 and 4,410,482. In the blends disclosed in U.S. Pat. No. 3,857,754, the compatibilizing polymer is one which contains a carbonyl group in its main or side chain, for example, polyacrylic acid, polymethacrylate esters, polyamides and various polyesters. The compatibilizers used in the compositions of U.S. Pat. No. 4,410,482 are generally ionomers derived from acidic copolymers.

Although polymer blends of this kind are capable of providing varied combinations of properties in the finished article, one problem has been that the dispersed phase will not always distribute itself in the continuous phase in a manner which provides the optimum combination of properties. When the resin blend is passed through the extruder, the extrudate will have a stratified structure consisting of layers of the individual polymers but the distribution of the dispersed phase in the continuous phase may not be uniform. Generally, the distribution is determined by the viscosity ratio of the two molten polymers with the higher viscosity component tending to stay close to the center of the molten polymer mass while the lower viscosity component is pushed towards the outside of the extrudate. The shape of the dispersed phase, on the other hand, is influenced by the elasticity ratio between the polymers and the stability of the component distribution by the relative thermodynamics and interfacial parameters of the resins in the blend. Thus, a number of different factors affect the morphology of the final article. Because these factors may not interact to produce a blend of the desired charactertics it will be desirable to evolve some method for improving the production of polymer blends of this kind.

SUMMARY OF THE INVENTION

We have now found that heterogeneous blends of different thermoplastic polymer resins may be produced by the use of a rotary tubular extrusion die and that the heterogeneous blends formed in this way have improved distribution of the dispersed resin phase in the continuous phase.

According to the present invention, thermo-plastic polymers are formed into an extrudate of a heterogeneous blend by extruding the mutually immiscible polymers through an annular extrusion die which has an annular flow passage in which the polymer mixture is subjected to transverse shear forces. The extruded product comprises a discontinuous phase (the flow segregated phase) distributed through a matrix of the continuous phase polymer.

The tubular extrusion die which is used for producing the heterogeneous polymer extrudates has an outer die wall and an inner wall which define the inner and outer lips of the annular extrusion outlet through which the polymer blend is extruded. An annular flow passage extends axially along the die between the walls for supplying the molten polymer blend to the extrusion outlet. The different components of the blend are fed into the flow passage through groups of holes arranged concentrically at the end of the flow passage, each group of holes being fed by an annular inlet passage for supplying one component of the blend. The inner and outer walls of the die may be rotated relative to one another as the polymer is extruded and it has been found that rotation of the die in this way is capable of producing substantial transverse shear fields to the polymer melts that are extruded through the die, i.e. transverse to the direction of movement of the polymer melt. The shear field promotes uniform distribution of the dispersed resin phase, giving a very uniform fine structure to this phase.

The continuous phase of the blend will generally be a polyolefin such as polyethylene and the discontinuous or dispersed phase will be selected so as to provide the desired properties to the blend, e.g. polyamides may be used for strength. It will therefore be selected to provide barrier properties, strength, stiffness, optical properties or tear resistant properties. A compatible interfacial additive may also be present in order to induce the formation of the desired stratified structure and to maintain it in a stable condition once it has been formed.

THE DRAWINGS

DETAILED DESCRIPTION

Polymers

Figure 1:
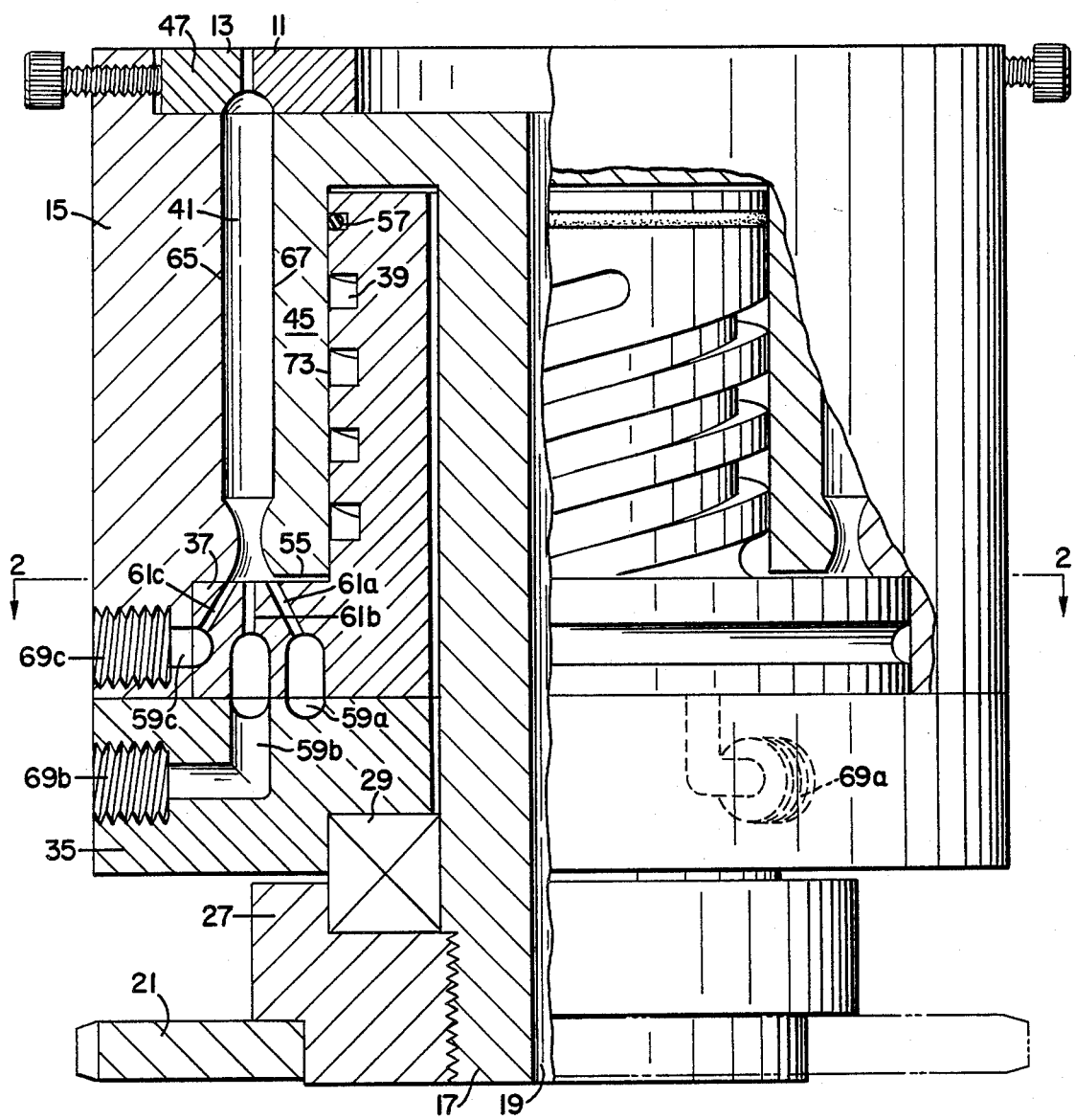
FIG. 1 is a partly-sectioned elevation of a tubular extrusion die which may be used to extrude the polymer blends.

The heterogeneous polymer blends produced by the present method are blends of a base polymer which forms a continuous matrix in which a discontinuous polymer component is distributed. Because the discontinuous phase remains segregated from the base or matrix polymer during processing, it may be referred to as the flow segregated component and the heterogeneous blend as a flow segregated system.

The thermoplastic polymer which makes up the continuous phase of the blend is the one which will determine many of the properties of the final article even though these properties may be modified by the presence of the other component, namely, the flow segregated component or the discontinous phase. Generally, the matrix or continuous phase will be a polyolefin such as polyethylene, polypropylene, polybutylene, or a copolymer of these materials. Homogeneous blends of these homopolymers and copolymers may also be employed where desired. A particularly preferred component for the matrix is polyethylene, and this may be high density polyethylene produced either by the low pressure or medium pressure polymerization processes or a low density polyethylene, i.e. a polyethylene having a density up to about 0.935 g. $cc^{-1}$. A particularly preferred class of low density polyethylenes are the linear, low density polyethylenes produced by the copolymerization of ethylene with a minor amount, typically 5 to 20 percent by weight, of a $C_4$ to $C_{12}$ alpha olefin comonomer such as hexene, octene or decene in the presence of a stereospecific polymerization catalyst. Various polyethylenes of this type are commercially available.

The flow segregated or discontinuous component of the blend is selected in order to provide the desired properties in the blend. Thus, it will frequently be chosen in order to provide vapor barrier properties so that the extruded articles have improved resistance to water vapor, carbon dioxide or other gases. Other properties which may be varied by the inclusion of the flow segregated component are strength, stiffness, optical characteristics and tear resistance. A wide variety of polymers are known which will confer these and other desired characteristics on the blend and provided that the polymer will form the desired heterogeneous blend, it may be extruded with the matrix polymer to form the heterogenous blends which are desired. The flow segregated component may typically be a polyamide or copolyamide, a polyester, a polycarbonate, polystyrene, polyacrylonitrile or various copolymers.

Polyamides and copolyamides are well known and are made by reacting carboxylic acids with primary amines under well-known conditions. Examples of carboxylic acids used in polyamide preparation are adipic acid, suberic acid, sebacic acid, azelaic acid, malonic acid, glutaric acid and pimelic acid. Examples of primary amines are tetramethylene diamine, pentamethylene diamine, hexamethylene diamine and octamethylene diamine. Exemplary polyamides include polypentamethylene adipamide, polyhexamethylene adipamide, polyhexamethylene sebacamide, polyamides obtained from lactams such as caprolactams and from amino acids such as 11-aminoundecanoic acid.

Polyesters are well known and may be made by reacting dibasic carboxylic acids with glycols under well-known conditions. Examples of carboxylic acids used in preparation of polyesters are terephthalic acid and isophthalic acid. Examples of glycols, ethylene glycol, butylene glycol, and other so-called polymethylene glycols having 2 to 10 methylene groups. Exemplary polyesters are polyethylene terephthalate and polybutylene terephthalate. Polyethylene terephthalate is preferred.

Polycarbonates are disclosed in the *Handbook of Common Polymers,* compiled by W. J. Roff and J. R. Scott, CRC Press, Cleveland, Ohio, U.S.A. (1971), to which reference is made for a description of them.

Other thermoplastic resins which may be used in the present blends include polystyrenes both of the impact and crystal grades, and copolymers of various kinds, for example, ethylene/vinyl acetate copolymers, ethylene/vinyl alcohol copolymers, ethylene/acrylate copolymers, e.g. ethylene/acrylic ester copolymers, ethylene/methacrylic ester copolymers, ethylene/vinyl chloride copolymers and various other thermoplastic resins, e.g. polyacrylonitrile which may be selected in order to provide the desired combination of properties in the final resin blend.

A compatible interfacial additive should also be present in order to stabilize the stratified structure of the blend. The compatibilizer will usually be a polymer which has carboxylic groups attached either to the polymer backbone or on side chains. The carboxylic groups may be present as carboxylic acid groups or as ester groups, and hydrides or salts, i.e. carboxylic acid groups neutralized by cations, especially by cations of the alkali or alkaline earth metals or zinc.

Compatibilizers can be prepared by direct synthesis or by grafting. An example of direct synthesis is the polymerization of an alpha-olefin with an olefinic monomer having a carboxylic moiety; and an example of grafting if the addition of a monomer having a carboxylic moiety to a polyolefin backbone. In the compatibilizer made by grafting, the polyolefin is polyethylene or a copolymer of ethylene and at least one alpha-olefin of 3–8 carbon atoms such as propylene or a copolymer including at least one alpha-olefin of 3–8 carbon atoms and a diolefin, such as 1,4-hexadiene. The polyolefin is reacted with an unsaturated carboxylic acid, anhydride, or ester monomer to obtain the grafter polymer. Representative eligible acids, anhydrides, and esters include: methacrylic acid; acrylic acid; ethacrylic acid; glycidyl methacrylate; 2-hydroxy ethylacrylate; 2-hydroxy ethyl methacrylate; diethyl maleate; monoethyl maleate; di-n-butyl maleate; maleic anhydride; maleic acid; fumaric acid; itaconic acid; monoesters of such dicarboxylic acids; dodecenyl succinic anhydride; 5-norbornene-2,3-anhydride; nadic anhydride (3,6-endomethylene-1,2,3,6-tetrahydrophthalic anhydride). Generally, the graft polymer will have from 0.01 to 20, preferably 0.1 to 10, and most preferably 0.2 to 5, weight percent graft monomer. Grafted polymers are described in greater detail in U.S. Pat. Nos. 4,026,967 and 3,953,655.

In compatibilizers made by direct synthesis, the polymeric material is suitably a copolymer of an α-olefin of 2–10 carbon atoms and an α, β-ethylenically unsaturated carboxylic acid, ester, anhydride, or salt having 1 or 2 carboxylic moieties. The directly synthesized compatibilizer is suitably made up of at least 75 mole percent of the olefin component and from 0.2 to 25 mole percent of the carboxylic component.

Ionomeric compatibilizers are preferably made from directly synthesized compatibilizer and is preferably made up of 90 to 99 mol percent olefin and 1 to 10 mol percent α,β-ethylenically unsaturated monomer having carboxylic groups neutralized with metal ions having valences of 1 to 3, inclusive, where the carboxylic acid groups are monocarboxylic and are neutralized with metal ions having a valence of 1 where the carboxylic acid groups is dicarboxylic. To control the degree of neutralization, metal ions are preferably present in an amount sufficient to neutralize at least 10 percent of the carboxyl moieties. Representative eligible α-olefins and unsaturated carboxylic acid, anhydride, and ester monomers are those previously herein described. Ionomeric polymers are described in greater detail in U.S. Pat. No. 3,264,272.

The matrix polymer will generally constitute at least 50 wt. percent of the total blend and more usually, at least 60, preferably at least 70, wt. percent of the total blend. The amount of the flow segregated component or discontinuous phase will be determined by the extent to which its characteristic properties are desired in the final blend and also by considerations of the overall strength of the article after extrusion. Generally, the discontinuous phase will not exceed 40 percent by wt. of the blend and generally will be in the range of 10-30 wt. percent of the blend. The compatibilizer will normally be present in amounts from 1-30 wt. percent of the blend, more usually 2-20 wt. percent and preferably 2-10 wt. percent of the total polymer composition. However, if the discontinuous phase forms a satisfactory blend with the matrix without the need for a compatibilizer, the third ingredient may be excluded. This may occur, for example, if the polymer which is to be added to the matrix has a composition which is basically that of one of the compatibilizers, e.g. an ethylene/acrylic copolymer.

Any or all of the blend components may be used to introduce inert fillers, dies and other additives, e.g. antioxidants into the composition provided that this will not interfere with the formation of the desired flow segregated structure in the final, extruded blend or with the desired properties of the composition. Opacifiers, colorants, lubricants, stabilizers and other additives may be used in their conventional amounts and added to the polymers in the normal way. The amount of filler is not included in the calculation of the amounts of the various polymers set out in this specification.

Extrusion Die

Figure 2:
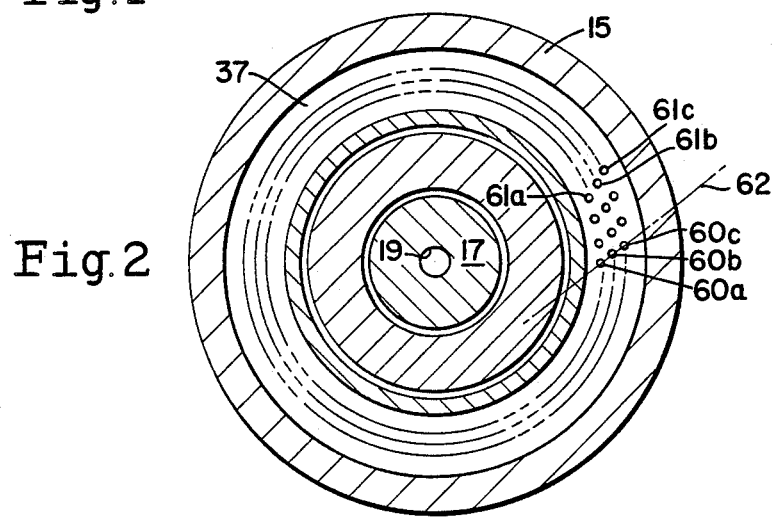
FIG. 2 is a section of the die of FIG. 1 along the line 2—2.

The polymers are extruded through a rotary, annular extrusion die shown in FIGS. 1 and 2 of the accompanying drawings.

The die includes an outer die body 15 having an interior peripheral surface 65 which defines the outer wall of an annular flow passage 41. The inner wall of annular flow passage 41 is formed by an outer peripheral surface 67 of a rotary hub 45. The annular flow passage 41 terminates at a die orifice formed by an outer die lip 13 and an inner die lip 11 provided at the terminal ends of the inner and outer walls respectively, on outer die body 15 and the rotary hub 45.

The components of the thermoplastic polymer blend are introduced into the annular flow passage 41 by three annular melt inlet passages 59a, 59b and 59c. These annular melt inlet passages are formed in a distribution plate 35 and a melt seal/distribution block 37 and are respectively connected to melt inlet orifices 69a, 69b and 69c which are connected to resin extruders (not shown). Distribution plate 35 is fixed to the melt seal/distribution plate 37.

The polymer melts flow into the annular flow passage 41 from the annular melt inlet passages 59a, 59b and 59c through respective concentric rings of holes 61a, 61b and 61c provided in the melt seal/distribution block 37. These holes which are equally spaced in each group, are shown in greater detail in FIG. 2. Each ring of holes, e.g. 61a, is on a fixed common radius from the die axis, with three rings 61a, 61b and 61c, each being on a different radius, as shown in FIG. 2. In addition, the holes of one ring are shifted, in a circumferential direction, i.e., radially offset, relative to the holes of the ring next to it. The holes are preferably arranged so that holes in the rings will align, e.g. on line 62, as illustrated in FIG. 2.

The rotary hub 45 of the die is formed with a hollow drive shaft 17 which is journalled on bearing 29 in distribution plate 35 to provide thrust support and radial location for shaft 17. Gas passage 19 through the center of shaft 17 is used to inflate the blown film bubble which is extruded through the die. A bearing retainer 27 is screwed onto shaft 17 to locate bearing 20, and a sprocket 21 which is attached to drive shaft 17 so that the shaft and hub 45 may be rotated by means of a suitable driving source (not shown) coupled to the sprocket by means of a driving chain.

The melt seal/distribution block 37 has a cylindrical upper portion which has on its outer circumferential periphery a screw thread 39 forming the flight channels of an extruder-type seal. The other part of the extruder type seal is formed by the inner peripheral wall 73 of the rotary hub 45. The screw threads 39 and wall 73 are arranged such that as rotary hub 45 rotates it forces any polymer melt tending to escape from the annular flow passage 41 through gap 55 between the bottom of rotary hub 45 and top of melt seal/distribution block 37 back into the annular flow passage. This extruder-type seal is highly effective in preventing loss of polymer melt even when it is under high pressure.

A die orifice adjustment ring 47 is provided which is fixed to the outer die body 15 and is adjustable in position to set the die gap between the inner die lip 11 and outer die lip 13 around the entire die orifice.

A rotary die of this kind is described in detail in copending application Ser. No. 474,630, filed 11 Mar. 1983 by G. V. Sharps, Jr., to which reference is made for a detailed description of the die and its manner of operation in the production of tubular extruded films.

When used for producing the flow segregated polymer blends of the present invention, the molten polymers making up the blends will be fed into the extrusion die through inlets 69a, 69b and 69c. The flow segregated component or discontinuous phase may be fed in through any of the inlets since it becomes dispersed through the continuous phase as the polymer melts pass up through the annular flow passageway 41 where they are subjected to the transverse shear forces by the relative movements of the die walls 65, 67. Depending upon whether the die hub is rotated or not and depending upon the speed of rotation, the discontinuous phase will be distributed differently in the final extrudate. As described in application Ser. No. 474,630, if the rotary hub is not rotated, a film with layers of the polymers obliquely oriented with respect to the inner and outer surfaces of the film wall may be formed. If die hub 45 is rotated, the flow conditions within annular flow passage 45 will tend to produce a product which has a number of layers of the different polymers, with the interface between the layers approximately parallel to the surface of the film. However, when the polymers do not form a homogenous blend and one is used in a relatively large amount compared to the other, the polymer which is present in the smaller amount will form a discontinuous phase which, being immiscible with the other phase, forms a flow segregated component which, under the influence of the transverse shear forces in the die, becomes distributed throughout the matrix of the other polymer in the form of thin, parallel and overlapping layers embedded in the continuous phase. It is the overlapping layers of the discontinuous phase which confer the desired properties on the extruded article, e.g. vapor barrier properties, while still retaining the desirable properties of the continuous phase matrix polymer.

Layered products may be produced by feeding the components of the flow segregated system, i.e. matrix polymer and dispersed polymer, into one or two of the polymer inlets, with a different polymer or polymers being fed into the remaining inlets. This will produce a layered product in which one or more of the layers comprises a flow segregated system of matrix polymer and dispersed polymer with the other layers being of a more conventional, homogeneous type. The shear forces in the die have been found to be sufficient to achieve the requisite distribution of the discontinuous phase in the matrix polymer even though these components do not themselves come into contact with the walls of the die. Particularly useful products of this kind may be formed using a central layer of a flow segregated system, e.g. of a polyamide dispersed in a polyolefin for improved strength or vapor barrier properties, with outer layers of polyolefin, e.g. LLDPE.

In addition to its ability to uniformly distribute a plurality of melt streams, the die has the capability of imparting a transverse direction (TD) orientation of the polymer molecules during the extrusion process, thus improving the orientation balance of the extruded product, i.e. the ratio of transverse direction (TD) to longitudinal or machine direction (MD) orientation. When rotation is employed, the extruded film has improved TD/MD orientation balance, thereby reducing the required blow up ratio (BUR) to attain a particular desired transverse molecular orientation, as described in Ser. No. 474,630.

The compatibilizer may be fed in with either the matrix phase resin or the discontinuous phase resin, suitably by mixing pellets of the compatibilizer resin with the other resin in the hopper of the extruder or extruders used for this resin.

The die produces an annular extrudate which will normally be formed into a blown film by the application of gas pressure to the interior of the hollow extrudate, in the conventional manner. Machine direction orientation may be provided in the conventional way by adjusting the speed of the nip rolls which collapse the blown film bubble prior to slitting or wind-up. The annular extrusion die may also be used for the production of blow molded articles in the conventional way, in which a hollow tubular extrudate or parison is extruded into an open mold cavity which is then closed on the end of the parison and gas injected into its interior to inflate it against the walls of the mold. When the polymer has cooled sufficiently, the mold may be opened and the formed article ejected in the normal way.

EXAMPLE 1

A three layer blown film laminate was made using a rotary extrusion die of the type shown in FIGS. 1 and 2. The outer layers of the laminate were formed of high density polyethylene (HDPE) and the inner layer was a flow segregated layer comprising 79 percent HDPE, 19 percent nylon-6 and 2 percent of ethylene/acrylic acid copolymer ionomer (Surlyn 1652-Trademark-, DuPont). The laminate was formed by injecting the components of the flow segregated laminate into the central ring of holes in the die, with the HDPE being injected into the inner and outer ring of holes. The die was rotated so that a laminar structure with outer layers of HDPE and a central core layer of the flow segregated material was produced.

EXAMPLE 2

A three layer laminate was made in the same manner as described in Example 1 but using low density polyethylene (LDPE, Mobil Chemical Company LLA533, density 0.920 g. $cc^{-1}$, melt index 2.0) as the outer layers and a central core layer comprising a flow segregated layer of 70 percent LDPE (Mobil LLA533), 24 percent ethylene/vinyl alcohol copolymer (Kuraray EPF grade) and 6 percent of the ionomer (Surlyn 1652).

EXAMPLES 3–6

Three layer ABA coextruded laminate films with a flow segegated structure in the core layer were produced in the same way as described in Example 1. LDPE (Mobil LLA533) was used to make the outer layers and the core layers were blends of LDPE (Mobil LLA533), ethylene/vinyl alcohol copolymer (Kuraray Grade EPF) and compatibilizer (Surlyn 1652 or DuPont CXA3101, a carbonyl modified ethylene copolymer). The physical properties of the stratified films are shown in Table 1 below.

TABLE 1

| Example No. | Properties of Films | | | |
|---|---|---|---|---|
| | 3 | 4 | 5 | 6 |
| Core Material | LLA-533 | LLA-533 + EPF + Surlyn 1652 (64/30/6) | LLA-533 + EPF + CXA 3101 (64/30/6) | LLA-533 + EPF (70/30) |
| Film Layer Ratio, Nominal | 100 | 5/90/5 | 20/60/20 | 20/60/20 |
| Total Thickness, (mils) | 3.2 | 3.0 | 8.2 | 4.8 |
| Normalized OTR* (based on core thickness) | 500 | 4 | 4 | 18 |
| Tensile Strength (psi) | MD 2880 | 4140 | 3970 | 3340 |
| | TD 2020 | 1350 | 1490 | 1410 |
| Percent Elongation | MD 406 | 370 | 470 | 436 |
| | TD 625 | 6 | 7 | 6 |
| Elmendorf Tear | MD 118 | 5 | 9 | 10 |

TABLE 1-continued

| | Properties of Films | | | |
|---|---|---|---|---|
| Example No. | 3 | 4 | 5 | 6 |
| (g/mil) | TD 97 | 16 | 40 | 28 |

*cc-mil/100 in²-24 hr-1 atm.

With the interfacial additives (Surlyn 1652 or CXA3101) the stratified coextrusion film showed a five-fold improvement in oxygen barrier proprties as compared to the coextruded film based on the blend with the same structure but without the interfacial additive in the core layer (compare Examples 4 and 5 with Example 6). The stratified coextruded film also showed a reduction in the oxygen transmission rate of over 130 times as compared to normal LDPE film (Example 3). The physcial properties of the coextruded films with the stratified core layers show that they have increased MD and reduced TD tensile strength but that the TD elongation and the MD tear strength values are decreased substantially.

We claim:

1. In a method of making an extrudate of a ternary heterogenous polymer blend comprising a continuous thermoplastic resin matrix having a discontinuous phase of a thermoplastic resin distributed within the matrix wherein the blend contains a compatibilizer resin to improve interfacial adherence between the resin of the continuous matrix phase and the resin of the discontinuous phase, the improvement which comprises subjecting the polymer blend to shear forces transverse to the direction of polymer movement in the extrusion die prior to passing through the die lips, said die having an annular flow passage which extends axially of the die between an outer die wall and an inner die wall wherein one of the inner and outer die walls is rotated relative to one another, and thereby obtaining an extruded polymer blend having improved vapor barrier properties.

2. A method according to claim 1 in which the polymer forming the discontinuous phase constitutes less than 50 weight percent of the total resin composition.

3. A method according to claim 2 in which the polymer forming the discontinuous phase constitutes 10 to 30 weight percent of the total resin composition.

4. A method according to claim 1 in which the discontinuous phase of the extrudate is present in the form of thin, overlapping substantially parallel layers embedded in the continuous matrix phase.

5. A method according to claim 1 in which the continuous matrix phase polymer comprises a polyolefin.

6. A method according to claim 1 in which the discontinuous phase resin comprises a resin having vapor barrier properties.

7. A method according to claim 6 in which the polymer having vapor barrier properties comprises a polyamide or an ethylene/vinyl acetate copolymer or an ethylene/vinyl alcohol copolymer.

8. A method according to claim 1 in which the extrudate from the die is expanded to form a blown film.

9. A method according to claim 8 in which the polymer blend is fed into the annular flow passage through at least one ring of holes arranged concentrically with the annular flow passage.

10. A method according to claim 9 in which the tubular extrusion die includes a plurality of concentrically arranged rings of holes for injecting polymer into the annular flow passage, each ring being arranged between the inner and outer wall and connected with an inlet for molten polymer.

11. A method according to claim 10 in which the die has three concentric rings of holes and the polymer blend is passed into the annular flow passage through the middle ring of holes.

12. A method according to claim 11 in which a thermoplastic polymer is passed into the annular flow passage through the inner and outer rings of concentric holes.

13. A method according to claim 12 in which the thermoplastic polymer passed into the inner and outer concentric rings of holes comprises a polyolefin.

14. In a method of making a thermoplastic resin film by blown film extrusion of a ternary heterogenous polymer blend comprising a compatibilizer resin, a continuous thermoplastic resin matrix and a discontinuous phase of a thermoplastic resin distributed within the matrix in which a molten stream of thermoplastic resin is extruded through an annular extrusion die to form a tubular extrudate which is expanded by means of internal gas pressure and longitudinally stretched to provide orientation in the film, the improvement which comprises extruding a thermoplastic polymer as the discontinuous phase of the blend through an annular extrusion die having an annular flow passage in which the resin mixture to be extruded is subjected to shear forces transverse to the direction of polymer movement in the extrusion die prior to passing through the die lips, said die having an annular flow passage which extends axially of the die between an outer die wall and an inner die wall wherein one of the inner and outer die walls is rotated relative to one another, and thereby obtaining an extruded polymer blend having improved vapor barrier properties.

15. A method according to claim 14 in which the discontinuous phase comprises less than 50 weight percent of the total resin composition.

16. A method according to claim 14 in which the continuous phase comprises a polyolefin.

17. A method according to claim 16 in which the continuous phase comprises linear, low density polyethylene.

18. A method according to claim 14 in which the discontinuous phase comprises a resin having vapor barrier properties greater than that of the continuous phase.

19. In a method of making a layered thermoplastic resin film by blown film extrusion of a ternary heterogenuous polymer blend comprising a compatibilizer resin, a continuous thermoplastic resin matrix and a discontinuous phase of a thermoplastic resin distributed within the matrix in which a plurality of streams of molten thermoplastic resin are co-extruded through an annular extrusion die to form a tubular extrudate which is expanded by means of internal gas pressure and longitudinally stretched to provide orientation in the film, the improvement which comprises subjecting the polymer blend to shear forces transverse to the direction of polymer movement in the extusion die prior to passing through the die lips, said die having an annular flow passage which extends axially of the die between an outer die wall and an inner die wall wherein one of the inner and outer die walls is rotated relative to one another, and thereby obtaining an extruded polymer blend having improved vapor barrier properties.

20. A method according to claim 19 in which the heterogeneuous blend comprises the central layer of a three layer film.

21. A method acording to claim 20 in which the heterogeneous blend comprises a blend of a polyolefin matrix and a discontinuous phase of a polymer having better vapor barrier properties or greater strength than the polyolefin.

22. A method according to claim 21 in which the discontinuous phase comprises a polyamide or an EVA copolymer.

23. A method according to claim 21 in which the polyolefin is LLDPE.

* * * * *